No. 803,058. PATENTED OCT. 31, 1905.
G. W. HENRY & F. W. BEALE.
APPARATUS FOR EXTRACTING CRUDE POTASH.
APPLICATION FILED OCT. 3, 1904.
3 SHEETS—SHEET 1.
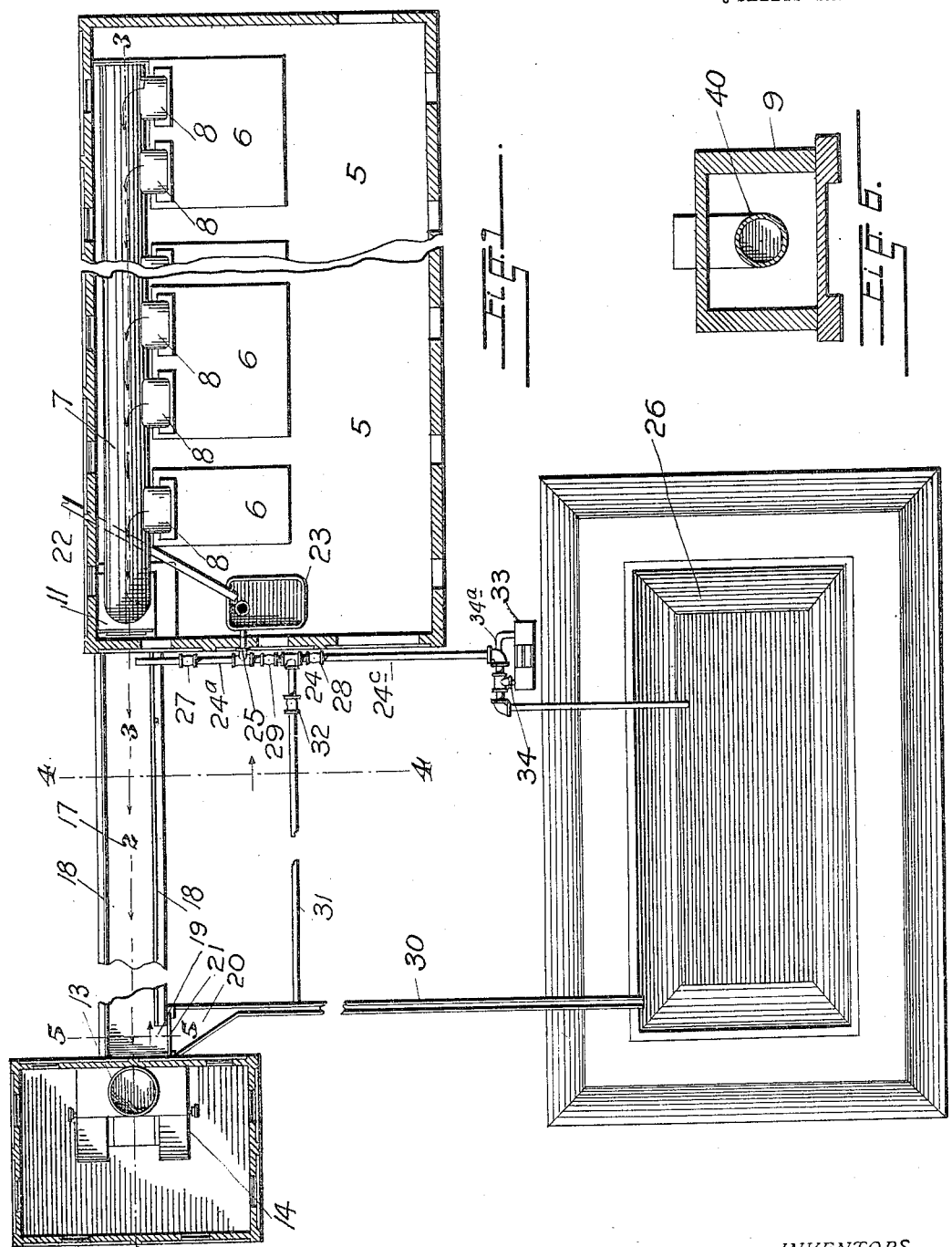
INVENTORS
George W. Henry
Frederick W. Beale
ATTORNEY.

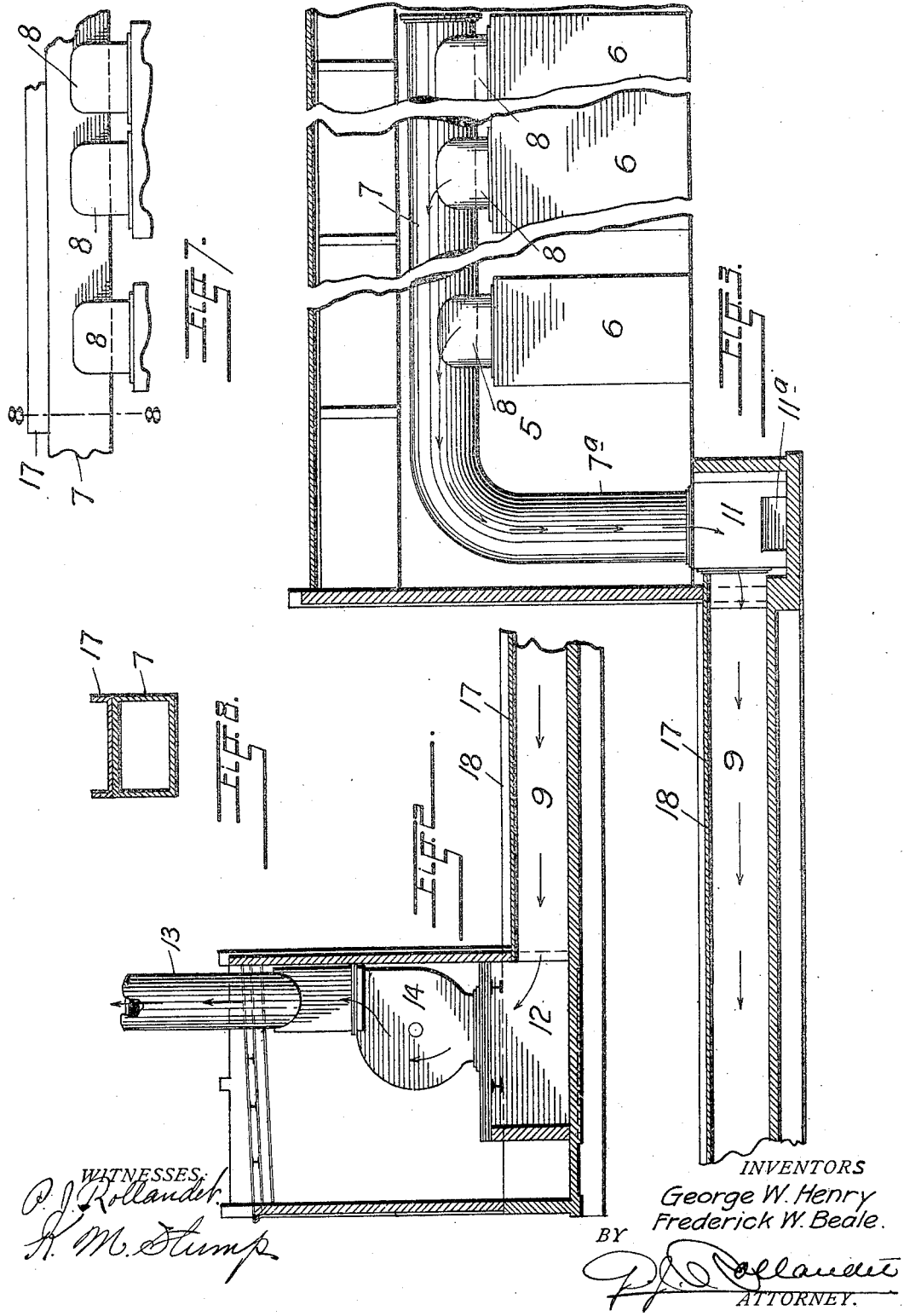

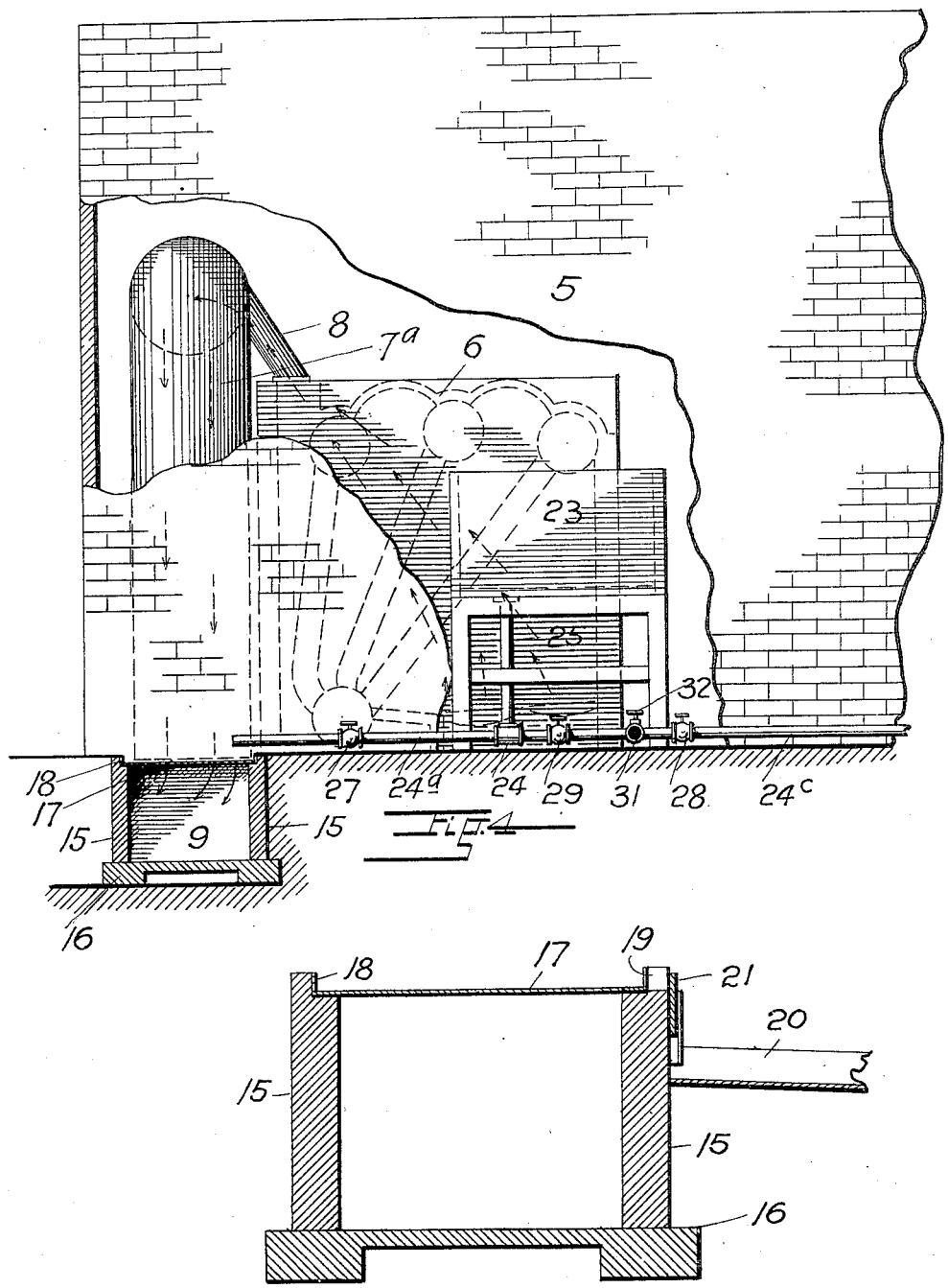

UNITED STATES PATENT OFFICE.

GEORGE W. HENRY AND FREDERICK W. BEALE, OF DENVER, COLORADO, ASSIGNORS TO MAX STRAUS, OF DENVER, COLORADO.

APPARATUS FOR EXTRACTING CRUDE POTASH.

No. 803,058.  Specification of Letters Patent.  Patented Oct. 31, 1905.

Application filed October 3, 1904. Serial No. 226,977.

*To all whom it may concern:*

Be it known that we, GEORGE W. HENRY and FREDERICK W. BEALE, citizens of the United States of America, residing at Denver, in the county of Denver and State of Colorado, have invented certain new and useful Improvements in Apparatus for Extracting Crude Potash from Waste Waters of Sugar-Factories, of which the following is a specification.

Our invention relates to a system or apparatus for the extraction of crude potash from certain waste waters derived during or after the course of the various processes employed in producing sugar, and although under certain conditions it may be used at cane-sugar factories it is more especially adapted to be used in connection with the processes employed in extracting sugar from beet-roots.

In most of the processes employed in extracting and producing beet-sugar one of the finishing factors is to subject the sugar-cakes to two washings, the first one of which removes the greater part of the foreign matter, and which has been found to contain large quantities of crude potash. The large quantity of water used during the first wash, (from six to eight times the weight of the molasses and often amounting to as much as a million pounds,) necessitating great evaporation, has made the recovery of the potash by that method practically impossible, for which reason it is in most factories allowed to run into the sewer, while in others, mostly on account of danger of polluting watercourses, it is used as a fertilizer, in which capacity it has been proven to have considerable value.

When taking in consideration the enormous yearly increasing quantities of sugar produced, it will readily be understood that the recovery of the potash contained in the wash-waters will materially increase the earnings of the various sugar-factories; and the object of our invention is to produce this result in a simple and economical manner, in principle based on evaporation of the liquid constituents of the potash-containing waters by subjecting them to the influence of artificially-produced heat.

In the method hereinafter described the necessary heat is supplied in a practically costless manner by allowing the waste waters to be subjected to the heat produced by the products of combustion arising from the grates in the combustion-chambers of the boilers on their way to the smoke-stack or chimney. It must be understood that this method, although it is preferable on account of its simplicity and cheapness, may be dispensed with and the heat required in the operation of our device supplied from any suitable source and in any suitable manner.

We attain our object by the mechanism illustrated in the accompanying drawings, in which—

Figure 1 represents a plan view of the apparatus, intermediate parts being omitted for lack of room; Fig. 2, an enlarged vertical section taken along the line 2 2, Fig. 1; Fig. 3, an enlarged vertical section taken along the line 3 3, Fig. 1; Fig. 4, an enlarged vertical section taken along the line 4 4, Fig. 1, looking in the direction of the arrow; Fig. 5, an enlarged vertical section taken along the line 5 5, Fig. 1, looking in the direction of the arrow; Figs. 6 and 7, modified forms of construction, and Fig. 8 a section taken along the line 8 8, Fig. 7.

Similar reference characters refer to similar parts throughout the various views.

Let 5 represent the boiler-house, in which are located the boilers 6 required to generate the power for operating the sugar-factory.

7 represents the breeching, consisting in this case, of a cylindrical sheet-metal pipe or conduit closed at one end and connecting with the combustion-chambers of the various boilers by means of short pipes 8. Pipe 7, extending over the boilers 6, is, as mentioned heretofore, closed at one end, while its opposite or open extermity $7^a$ is bent downwardly at right angles to the main body and connects with a horizontally-disposed flue or conduit 9, extending outside of building 5. To prevent cinders and other products of imperfect combustion from being carried into flue 9, a cinder-trap 11 is interposed between the mouth of flue 9 and the downwardly-extending extremity $7^a$ of the breeching, while a door $11^a$, opening in the side of the trap, facilitates the removal of accumulated matter.

Flue 9, extending outside the boiler-house, may be of any desired length and terminates in a smoke-chamber 12, surmounted by a stack or chimney 13. In the construction shown in the drawings a suction-fan 14 is interposed between the end of the flue and the chimney for the purpose of creating an induced draft. It must be understood, however, that, circumstances permitting, the fan may be omitted and the flue directly connected to a stack, which, as a matter of fact, should be of sufficient height to create the draft necessary in drawing the smoke and gases from the combustion-chambers into and through the conduit.

Flue 9 is composed of two side walls 15, extending between the cinder-trap 11 and smoke-box 13 and vertically erected on a foundation 16. Set into the top of the walls and extending over the entire width and length of the flue is a shallow sheet-metal trough 17, the vertical sides 18 of which extend to the top of the wall, while an outlet 19, cut into one of the sides 18 near the terminal of the flue, allows the discharge of fluid from the trough into an overflow-apron 20. A vertically-sliding gate 21, located below the opening 19, controls the outflow for purposes hereinafter described.

The waste water discharged from the filtering-presses, which being no part of our invention have been omitted in the drawings, is conveyed, by means of a conduit 22, into a tank 23, erected inside the boiler-house at a point preferably in close proximity to the head of trough 17. A pipe 25, leading from the bottom of the tank, connects with a cross-pipe 24, one arm $24^a$ of which terminates above trough 17 near its head, while the oppositely-extending arm $24^c$ is let into a suitably-located reservoir or basin 26. A valve 27, located between the extremities of pipe $24^a$, controls the flow of liquid from the tank into the trough, while valves 28 and 29, located near the extremities of pipe $24^a$, control the flow of liquid to and from the basin. The overflow-apron 20, located beneath the outlet 19 in the side of the trough, narrows into a trough 30, which, extending into basin 26, connects with pipe $24^c$ by means of a pipe 31, having a valve 32. A suction-pump 33, located near basin 26, connects with pipe $24^c$ by means of pipes 34 and $34^a$ for the purpose of drawing the fluid from the basin into tank 23, as will hereinafter be explained.

Prior to allowing the waste water to enter the trough the approximate quantity of liquid which during a certain period can be evaporated should by careful experiments be determined.

As the degree of evaporation principally depends on the temperature of the smoke and gases passing through the flue, as well as of the surrounding atmosphere, while the length of the period during which the fluid is allowed to remain in the trough is determined by the quantity of water contained in the tank and the frequency of the discharges from the filtering-press, it will readily be understood that the quantity of water allowed at one time to flow from the tank into the trough will vary according to circumstances. It is for this reason of the utmost importance that to insure regular and successful operation of the apparatus the capacity of the tank be regulated in accordance with the length of the evaporation period and the degree of evaporation. This is accomplished by raising or lowering gate 21, which determines the height of the water-level above the bottom of the trough. The amount of water thus having been determined, valve 27 is opened and the fluid, which has a density of about six per cent. Brix, allowed to run from the tank 23 into the trough, in which during the determined period by influence of the heat arising from the gases in the flue it will evaporate, leaving the crude potash in the form of a syrup-like residue having a density of approximately 90.5 per cent. Brix. The crude potash thus obtained may be removed at any time by means of rakes or other suitable implements. At the end of the evaporation period valve 27 is again opened and the above-described operation repeated and continued during the entire desugarizing process or as long as waste water is supplied from the filtering-presses to tank 23.

If on account of lowering of the temperature of the surrounding atmosphere or of the gases in the flue or for any other reason the liquid at the expiration of the period has not been evaporated or if by chance more water than the predetermined quantity is allowed to run into the trough, the surplus of the fluid rising above the upper edge of gate 21 will flow into the overflow-apron 20 and from there through trough 30 into basin 26, in which, if allowed to remain, the fluid will in course of time evaporate, leaving the potash residue at the bottom of the reservoir.

Should the supply of water from the filtering-presses exceed the capacity of the tank or should repairs or other reasons forbid the use of the flue, the surplus water may be drawn from the tank and allowed to flow into the basin through pipe 31 and trough 30 by opening valves 29 and 32 and closing valves 27 and 28.

Under ordinary conditions the water which during the operation of the process has accumulated in basin 26 is allowed to remain there until the flow of water from the filtering-presses ceases and tank 23 becomes empty, when by opening valves 28, 25, and 27 and operating suction-pump 33 the water is drawn from the reservoir through pipe 24 and into the trough, where it is once more subjected to the heat arising from the smoke and gases passing through the flue.

In some cases, especially when the supply from the presses is unusually large, the evaporation period may be shortened and the water, with the residue, allowed to flow through trough 30 into the reservoir, in which the remaining fluid is evaporated by exposure to the atmosphere.

It will be understood that, although the apparatus as shown in the drawings is preferable on account of its simplicity, practicability, and economy, the position and arrangement of the various parts, as well as their shape, may be altered to suit circumstances. In the modified form illustrated in Fig. 6 a pipe 40, extending through the flue, is substituted for the trough hereinabove described, while Figs. 7 and 8 show the trough surmounting the breeching 7, a form particularly adapted for use in plants where the smoke-stack is in close proximity to or adjoins the boiler-house.

Having thus described our invention, what we claim is—

1. In apparatus for extracting potash from waste-waters of sugar-factories, a heated evaporating-trough having a gate-controlled outlet, means for supplying the trough with the waste wash-waters derived from the plant, an independent non-heated basin, and a conduit adapted to convey liquid discharged through said outlet into said basin.

2. In apparatus for extracting potash from waste-waters of sugar-factories, a heated evaporating-trough having a gate-controlled outlet, means for supplying trough with the waste wash-waters derived from the plant, an independent non-heated basin, a conduit adapted to convey liquid discharged through said outlet into the said basin, and means for exhausting the fluid in said basin.

3. In apparatus for extracting potash from waste-waters of sugar-factories, a heated evaporating-trough having a gate-controlled outlet, means for supplying the trough with the waste wash-waters derived from the plant, an independent non-heated basin, a conduit adapted to convey liquid discharged through said outlet into the said basin, means for drawing the fluid from said basin, and a conduit adapted to convey said drawn-off fluid into the said evaporating-trough.

4. In apparatus for extracting potash from waste-waters of sugar-factories, a heated evaporating-trough having a gate-controlled outlet, means for supplying trough with the waste wash-waters derived from the plant, an independent non-heated basin, a conduit adapted to convey liquid discharged through said outlet into the said basin, means for drawing the fluid from said basin, a conduit adapted to convey said drawn-off fluid into said evaporating-trough, and a conduit adapted to convey the waste wash-waters derived from the plant into said basin, independent of the said evaporating-trough.

5. An apparatus of the class named comprising a tank, means for supplying the same with the waste wash-waters derived from the plant, an evaporating-trough having a gate-controlled outlet, a valve-controlled conduit adapted to convey waters from said tank into said trough, a suitably-located basin, a conduit adapted to convey liquid discharged through said outlet into said basin, means for drawing liquid from said basin, a conduit adapted to convey the drawn-off liquid into the said trough, and a conduit adapted to convey the waters from the said tank into said basin, independent of said trough.

In testimony whereof we have affixed our signatures in presence of two witnesses.

GEORGE W. HENRY.
FREDERICK W. BEALE.

Witnesses:
   NELLIE PRESTON,
   MIGNON PRESTON.